(12) United States Patent
Lockton et al.

(10) Patent No.: US 9,716,918 B1
(45) Date of Patent: Jul. 25, 2017

(54) INTERACTIVE ADVERTISING SYSTEM

(75) Inventors: David B. Lockton, Carmel, CA (US); Kathy Austin Lockton, Carmel, CA (US)

(73) Assignee: WinView, Inc., Redwood City, CA (US)

(*) Notice: Subject to any disclaimer, the term of this patent is extended or adjusted under 35 U.S.C. 154(b) by 2065 days.

(21) Appl. No.: 12/590,608

(22) Filed: Nov. 10, 2009

Related U.S. Application Data

(60) Provisional application No. 61/198,784, filed on Nov. 10, 2008.

(51) Int. Cl.

| | |
|---|---|
| H04N 7/16 | (2011.01) |
| H04N 21/81 | (2011.01) |
| H04N 21/433 | (2011.01) |
| H04N 21/435 | (2011.01) |
| H04N 21/45 | (2011.01) |
| H04N 21/258 | (2011.01) |
| H04N 21/4784 | (2011.01) |

(52) U.S. Cl.
CPC ......... H04N 21/812 (2013.01); H04N 21/435 (2013.01); H04N 21/4331 (2013.01); H04N 21/4532 (2013.01); H04N 21/25883 (2013.01); H04N 21/4784 (2013.01)

(58) Field of Classification Search
CPC ............ H04N 21/812; H04N 21/4784; H04N 21/4331; H04N 21/435; H04N 21/4532; H04N 21/25883
See application file for complete search history.

(56) References Cited

U.S. PATENT DOCUMENTS

| | | | |
|---|---|---|---|
| 4,592,546 A | 6/1986 | Fascenda et al. | |
| 4,816,904 A | 3/1989 | McKenna et al. | |
| 5,013,038 A | 5/1991 | Luxenberg et al. | |
| 5,035,422 A | 7/1991 | Berman | |
| 5,073,931 A | 12/1991 | Audebert et al. | |
| 5,083,271 A | 1/1992 | Thacher et al. | |
| 5,083,800 A | 1/1992 | Lockton | |
| 5,120,076 A | 6/1992 | Luxenberg et al. | |
| 5,213,337 A | 5/1993 | Sherman | |
| 5,227,874 A | 7/1993 | Von Kohorn | |
| 5,263,723 A | 11/1993 | Pearson et al. | |
| 5,283,734 A | 2/1994 | Von Kohorn | |
| 5,343,236 A | 8/1994 | Koppe et al. | |
| 5,343,239 A | 8/1994 | Lappington et al. | |

(Continued)

FOREIGN PATENT DOCUMENTS

| | | |
|---|---|---|
| CA | 2252021 | 6/1999 |
| CA | 2252074 | 6/1999 |

(Continued)

OTHER PUBLICATIONS

Claire Sponheim, "1ST and Sportal.com: Live on the Internet—Best Practices—Case Studies," Sep. 14, 2001, www.isk.co.uk/NEWS/dotcomlist_sportal.html., 4 pages.

(Continued)

*Primary Examiner* — Yassin Alata

(74) *Attorney, Agent, or Firm* — Fish & Richardson P.C.

(57) ABSTRACT

Methods, systems, and apparatus, including computer programs encoded on computer storage media, for providing an interactive advertising system and components thereof.

22 Claims, 1 Drawing Sheet

(56) References Cited

U.S. PATENT DOCUMENTS

| | | | |
|---|---|---|---|
| 5,462,275 A | 10/1995 | Lowe et al. | |
| 5,479,492 A | 12/1995 | Hofstee et al. | |
| 5,586,257 A | 12/1996 | Perlman | |
| 5,589,765 A | 12/1996 | Ohmart et al. | |
| 5,638,113 A * | 6/1997 | Lappington et al. | 725/141 |
| 5,643,088 A | 7/1997 | Vaughn et al. | |
| 5,762,552 A | 6/1998 | Vuong et al. | |
| 5,764,275 A | 6/1998 | Lappington et al. | |
| 5,813,913 A | 9/1998 | Berner et al. | |
| 5,838,774 A | 11/1998 | Weisser, Jr. | |
| 5,860,862 A | 1/1999 | Junkin | |
| 5,970,143 A | 10/1999 | Schneier et al. | |
| 5,971,854 A | 10/1999 | Pearson et al. | |
| 5,987,440 A | 11/1999 | O'Neil et al. | |
| 6,016,337 A | 1/2000 | Pykalisto | |
| 6,174,237 B1 | 1/2001 | Stephenson | |
| 6,182,084 B1 | 1/2001 | Cockrell et al. | |
| 6,193,610 B1 | 2/2001 | Junkin | |
| 6,425,828 B2 | 7/2002 | Walker et al. | |
| 6,578,068 B1 | 6/2003 | Bowman-Amuah | |
| 6,604,997 B2 | 8/2003 | Saidakovsky et al. | |
| 6,610,953 B1 | 8/2003 | Tao et al. | |
| 6,648,760 B1 | 11/2003 | Nicastro | |
| 6,718,350 B1 | 4/2004 | Karbowski | |
| 6,758,754 B1 | 7/2004 | Lavanchy | |
| 6,760,595 B2 | 7/2004 | Inselberg | |
| 6,763,377 B1 | 7/2004 | Belknap et al. | |
| 6,774,926 B1 | 8/2004 | Ellis et al. | |
| 6,807,675 B1 | 10/2004 | Maillard et al. | |
| 6,816,628 B1 | 11/2004 | Sarachik et al. | |
| 6,817,947 B2 | 11/2004 | Tanskanen | |
| 6,824,469 B2 | 11/2004 | Allibhoy et al. | |
| 6,840,861 B2 | 1/2005 | Jordan et al. | |
| 6,857,122 B1 | 2/2005 | Takeda et al. | |
| 6,863,610 B2 | 3/2005 | Vancraeynest | |
| 6,870,720 B2 | 3/2005 | Iwata et al. | |
| 6,871,226 B1 | 3/2005 | Ensley et al. | |
| 6,887,159 B2 | 5/2005 | Leen et al. | |
| 6,942,574 B1 | 9/2005 | Lemay et al. | |
| 6,944,228 B1 | 9/2005 | Dakss et al. | |
| 6,960,088 B1 | 11/2005 | Long | |
| 6,978,053 B1 | 12/2005 | Sarachik et al. | |
| 7,076,434 B1 | 7/2006 | Newnam et al. | |
| 7,085,552 B2 | 8/2006 | Buckley | |
| 7,117,517 B1 | 10/2006 | Milazzo et al. | |
| 7,120,924 B1 | 10/2006 | Katcher et al. | |
| 7,191,447 B1 | 3/2007 | Ellis et al. | |
| 7,228,349 B2 | 6/2007 | Barone, Jr. et al. | |
| 7,231,630 B2 | 6/2007 | Acott et al. | |
| 7,249,367 B2 | 7/2007 | Bove, Jr. et al. | |
| 7,254,605 B1 | 8/2007 | Strum | |
| 7,260,782 B2 | 8/2007 | Wallace et al. | |
| 7,283,830 B2 | 10/2007 | Buckley | |
| 7,343,617 B1 | 3/2008 | Katcher et al. | |
| 7,367,042 B1 | 4/2008 | Dakss et al. | |
| 7,430,718 B2 | 9/2008 | Gariepy-Viles | |
| 7,460,037 B2 | 12/2008 | Cattone et al. | |
| 7,461,067 B2 | 12/2008 | Dewing et al. | |
| 8,149,530 B1 | 4/2012 | Lockton et al. | |
| 2001/0013125 A1 * | 8/2001 | Kitsukawa et al. | 725/36 |
| 2001/0020298 A1 | 9/2001 | Rector, Jr. et al. | |
| 2001/0032333 A1 | 10/2001 | Flickinger | |
| 2002/0054088 A1 | 5/2002 | Tanskanen et al. | |
| 2002/0056089 A1 | 5/2002 | Houston | |
| 2002/0095333 A1 * | 7/2002 | Jokinen et al. | 705/14 |
| 2002/0097983 A1 | 7/2002 | Wallace et al. | |
| 2002/0099709 A1 | 7/2002 | Wallace | |
| 2002/0100063 A1 | 7/2002 | Herigstad et al. | |
| 2002/0105535 A1 | 8/2002 | Wallace et al. | |
| 2002/0108112 A1 | 8/2002 | Wallace et al. | |
| 2002/0108125 A1 | 8/2002 | Joao | |
| 2002/0112249 A1 * | 8/2002 | Hendricks et al. | 725/136 |
| 2002/0124247 A1 | 9/2002 | Houghton | |
| 2002/0133817 A1 | 9/2002 | Markel | |
| 2002/0198050 A1 | 12/2002 | Patchen | |
| 2003/0040363 A1 | 2/2003 | Sandberg | |
| 2003/0069828 A1 | 4/2003 | Blazey et al. | |
| 2003/0070174 A1 | 4/2003 | Solomon | |
| 2003/0115152 A1 | 6/2003 | Flaherty | |
| 2003/0144017 A1 | 7/2003 | Inselberg | |
| 2003/0154242 A1 | 8/2003 | Hayes et al. | |
| 2003/0177504 A1 | 9/2003 | Paulo et al. | |
| 2003/0189668 A1 | 10/2003 | Newnam et al. | |
| 2003/0233425 A1 | 12/2003 | Lyons et al. | |
| 2004/0073915 A1 | 4/2004 | Dureau | |
| 2004/0093302 A1 | 5/2004 | Baker et al. | |
| 2004/0107138 A1 * | 6/2004 | Maggio | 705/14 |
| 2004/0117839 A1 | 6/2004 | Watson et al. | |
| 2004/0158855 A1 | 8/2004 | Gu et al. | |
| 2004/0178923 A1 | 9/2004 | Kuang | |
| 2004/0190779 A1 | 9/2004 | Sarachik et al. | |
| 2004/0198495 A1 | 10/2004 | Cisneros et al. | |
| 2004/0216161 A1 | 10/2004 | Barone, Jr. et al. | |
| 2004/0216171 A1 | 10/2004 | Barone, Jr. et al. | |
| 2004/0224750 A1 | 11/2004 | Al-Ziyoud | |
| 2004/0242321 A1 | 12/2004 | Overton | |
| 2005/0005303 A1 | 1/2005 | Barone, Jr. et al. | |
| 2005/0076371 A1 | 4/2005 | Nakamura | |
| 2005/0097599 A1 | 5/2005 | Plotnick et al. | |
| 2005/0131984 A1 | 6/2005 | Hofmann et al. | |
| 2005/0235043 A1 | 10/2005 | Teodosiu et al. | |
| 2005/0273804 A1 | 12/2005 | Preisman | |
| 2005/0283800 A1 | 12/2005 | Ellis et al. | |
| 2005/0288080 A1 | 12/2005 | Lockton et al. | |
| 2005/0288812 A1 | 12/2005 | Cheng et al. | |
| 2006/0053390 A1 | 3/2006 | Gariepy-Viles | |
| 2006/0059161 A1 | 3/2006 | Millett et al. | |
| 2006/0082068 A1 | 4/2006 | Patchen | |
| 2006/0205483 A1 | 9/2006 | Meyer et al. | |
| 2006/0256865 A1 | 11/2006 | Westerman | |
| 2006/0256868 A1 | 11/2006 | Westerman | |
| 2006/0269120 A1 | 11/2006 | Nehmadi et al. | |
| 2006/0285586 A1 | 12/2006 | Westerman | |
| 2007/0028272 A1 | 2/2007 | Lockton | |
| 2007/0054695 A1 | 3/2007 | Huske et al. | |
| 2007/0078009 A1 | 4/2007 | Lockton et al. | |
| 2007/0086465 A1 | 4/2007 | Paila et al. | |
| 2007/0107010 A1 | 5/2007 | Jolna et al. | |
| 2007/0210908 A1 | 9/2007 | Putterman et al. | |
| 2007/0222652 A1 | 9/2007 | Cattone et al. | |
| 2007/0226062 A1 | 9/2007 | Hughes et al. | |
| 2007/0243936 A1 | 10/2007 | Binenstock et al. | |
| 2008/0013927 A1 | 1/2008 | Kelly et al. | |
| 2008/0066129 A1 | 3/2008 | Katcher et al. | |
| 2009/0011781 A1 | 1/2009 | Merrill et al. | |
| 2009/0094632 A1 | 4/2009 | Newnam et al. | |
| 2010/0107194 A1 | 4/2010 | McKissick et al. | |

FOREIGN PATENT DOCUMENTS

| | | |
|---|---|---|
| CA | 2279069 | 3/2000 |
| CA | 2287617 | 4/2000 |
| EP | 0649102 | 6/1996 |
| JP | 11046356 | 2/1999 |
| JP | 11239183 | 8/1999 |
| JP | 200128743 | 1/2000 |
| JP | 2000165840 | 6/2000 |
| JP | 2000209563 | 7/2000 |
| JP | 2000217094 | 8/2000 |
| JP | 2000358255 | 12/2000 |
| NZ | 330242 | 10/1998 |
| WO | 0165743 | 9/2001 |
| WO | 2006004855 | 1/2006 |
| WO | 2006004856 | 1/2006 |
| WO | 2006024302 | 3/2006 |
| WO | 2007002284 | 1/2007 |
| WO | 2007016575 | 2/2007 |
| WO | 2007041667 | 4/2007 |

(56) References Cited

OTHER PUBLICATIONS

"ark™ 4.0 standard edition, Technical Overview," Jun. 10, 2005, www.twowaytv.com/version4/technologies/tech_ark_professional.asp., 18 pages.

Tristan Henderson and Saleem Bhatti, Modeling User Behaviour in Networked Games, Jun. 25, 2001, 16 pages.

Mostafa H. Ammar and George N. Rouskas, "On the Performance of Protocols for Collecting Responses over a Multiple-Access Channel," 1991, IEEE, pp. 1490-1499, 10 pages.

"PurpleAce Launches 3GSM Ringtone Competition," Wireless Developer Network, WirelessDevNet.com Press Release, www.wirelessdevnet.com/news/2005/jan/31/news6.html., downloaded May 25, 2005, 2 pages.

"PurpleAce Launches 3GSM Ringtone Competition," Mobile Marketing, Mobile Music, Mobile Social Software, tt://jgohil.typepad.com/minternet360/mobile_social_software/ (Incomplete web address), downloaded Feb. 3, 2005, 1 page.

Wilfried Woeber, "Re: Multicast Based Voting System," Oct. 1, 1997, www.ripe.net/ripe/maillists/archives/mbone-eu-op/, 1997/msg00100.html, downloaded May 31, 2005, 8 pages.

"SMS Based Voting and Survey System for Meetings," www.abbit.be/technology/SMSSURVEY.html., downloaded May 25, 2005, 8 pages.

"Patent and Filing Map," Two Way TV, www.twowaytv.com/version4/technologies/tech_patents.asp, downloaded Jun. 10, 2005, 3 pages.

Robert Davis and David Yung, "Understanding the Interactivity Between Television and Mobile Commerce," Communications of the ACM, Jul. 2005, vol. 48, No. 7, pp. 103-105, 3 pages.

\* cited by examiner

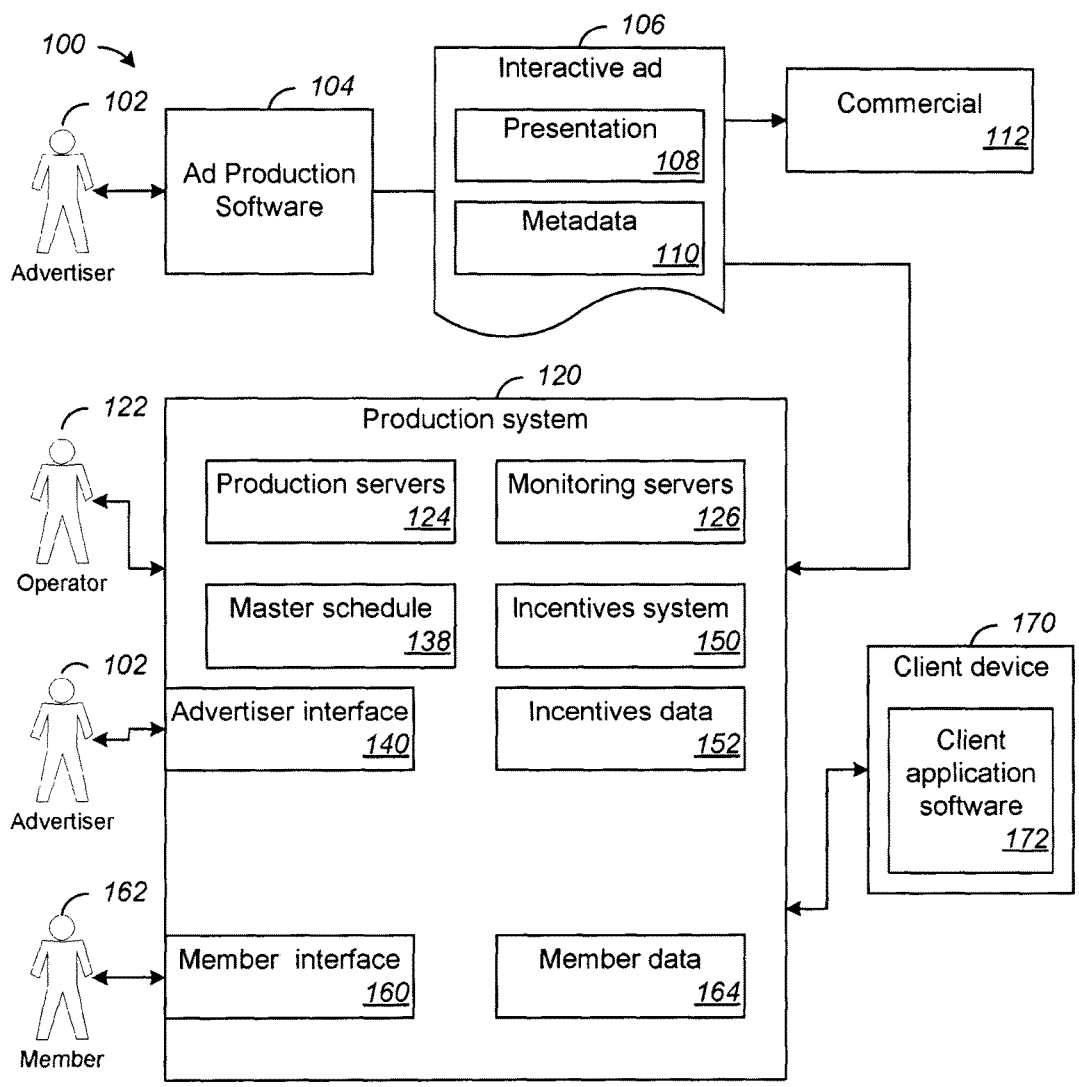

INTERACTIVE ADVERTISING SYSTEM

CROSS-REFERENCE TO RELATED APPLICATIONS

This application claims the benefit under 35 U.S.C. §119 (e) of U.S. Patent Application No. 61/198,784, titled "WinView System," filed Nov. 10, 2008, which is incorporated here by reference.

BACKGROUND

Systems exist that allow viewers to watch live TV with interactive material presented on another device.

U.S. Pat. No. 5,643,088 for "Game of skill or chance playable by remote participants in conjunction with a common game event including inserted interactive advertising" describes one such system.

SUMMARY

This specification describes a unified, real-time, end-to-end interactive advertising system suitable for use with television programs and commercials. The system can simulcast a precisely synchronized interactive ad at the same time as a broadcast commercial, e.g., a television commercial, where the ad is viewable on a cell phone, personal computer (PC) or other client device.

In this specification, the word "commercial" will be used to refer to the advertising content that is broadcast, for example, within or between radio and television programs, to sponsor the programs. The word "ad"—alone or in combinations—will be used to refer to part or all of the metadata and content that defines an interactive ad, some or all of which is transmitted to client devices to be played by the client devices and interacted with by the viewers at the same time the commercial is broadcast. When a commercial is linked to such an interactive ad, it may be referred to as an "interactively-enhanced commercial;" or in reference to a particular ad, the commercial may be referred to as the "underlying commercial."

The system electronically schedules and co-ordinates the synchronization of the interactive ad with the broadcast commercial. The system can broadcast ads itself or broadcast them through intermediaries. The system broadcasts ads to members' selected client devices, e.g., cell phones.

The system has registered users, who will be referred to as members. However, the system can optionally also provide interactive ads to viewers who are not members.

The system maintains a repository for the collection, storage, analysis and reporting of members' (and, optionally, other viewers') responses to interactively-enhanced commercials and members' eligibility for awards, points, coupons and prizes.

The system provides notifications to viewers and members of upcoming interactively-enhanced commercials, both over the commercials' broadcast channels to the viewers' televisions and through the members' client devices. The notifications can include information describing incentives for viewers who successfully perform an interactive ad task in connection with the commercial, which is intended to demonstrate engagement in and comprehension of the commercial. At the conclusion of a commercial, for example, an ad could ask questions about the commercial to establish the viewer's level of comprehension of the sponsor's message.

The system includes a production system that can perform the time synchronized transmission of interactive ad presentations to members over a cellular telephone network, the Internet, satellite transmission or other data paths separate from the broadcast of the commercial itself. The system can also collect responses from the members who interact with the ad and reports this data.

The system includes tools for the production by advertisers of interactive ads, which can contain text, audio, and graphics directly relating to a specific commercial, will contain data defining viewer interactions relating to the commercial.

The system provides tools for advertisers to request data reports.

The system provides schedules of upcoming television broadcasts of programs that include interactively-enhanced commercials for the use of broadcasters, advertisers, and members.

The system provides tools for members to customize individual preferences, interests, and display options.

The system is used by and interacts with a number of participants. These include:

(i) advertisers that create and produce commercials and interactive ads for commercials, making standard commercials into interactively-enhanced commercials, and that provide incentives for people who participate in interactive ads, their own or others';

(ii) broadcast networks, in particular, television networks, local stations, cable operators, DVR service providers, and satellite networks that deliver the programming and commercials (collectively, "broadcasters");

(iii) mobile phone operating companies that pre-load the client application software for the system on their mobile phones and execute real-time communications between the interactive advertising system's servers and members' mobile phones;

(iv) distribution companies such as cable and satellite service providers that have DVRs or other customer site equipment that can be programmed as client devices and interact as such with the system; and (v) the system operator or operators who receive, schedule and synchronize the transmission of the interactive ads to the viewers' client devices enabling their interaction.

Particular embodiments of the subject matter described in this specification can be implemented so as to realize one or more of the following advantages. The system requires no modification to the commercial or any specialized equipment for the viewer. The system can make any television commercial broadcast into a mass audience interactive, measurable and real-time participatory one, without any modification of the underlying television commercial itself. Unlike systems which need a cable or satellite box, the system enables every viewer in a household with a cell phone to participate. The system allows advertisers to provide meaningful rewards for a viewer's participation. The system can provide advertisers within minutes of their broadcast with detailed demographic and psychographic reports to their specifications, on the system's members' participation in their ads based on information members supply at registration as opposed to reports based on cable or satellite subscriber data. The system will enable anyone to interact in real-time with broadcast commercials.

DESCRIPTION OF DRAWINGS

The FIGURE is a schematic diagram illustrating an interactive advertising system.

Like reference symbols in the various drawings indicate like elements.

DETAILED DESCRIPTION

The features of an illustrative implementation of an interactive advertising system 100 will now be described in reference to the FIGURE.

Interactive Ad Production Software

An advertiser 102 preparing an interactive ad 106 will use a software application or component, which will be referred to as the ad production software 104. In some implementations, this software is a stand alone software application that can be run on a personal computer, a television production system, or other data processing platform. In other implementations, this software is implemented as a module in a larger application, for example, a video production system used to produce commercials for broadcast. In other implementations, this software is implemented as a web service, e.g., a web service provided by the interactive advertising system.

The ad production software generates components of an interactive ad in a form that can be used by the components of the interactive advertising system. An interactive ad will generally include both an interactive ad presentation 108 that can be played by a client device and interactive ad metadata 110 that can include data describing the ad, the advertiser, any incentives being offered by the advertiser in connection with the advertisement, the underlying commercial 112, target viewer demographics for the ad, reports requested by the advertiser, and other information relating to the ad. In some implementations, the software generates the data in the form of an interactive ad data package, which is a collection of data resources or, preferably, a container containing the data, e.g., in the form of separate data files in a ZIP archive or separate documents in an XML document.

Generally, the production of an interactive ad will take place after the completion of the underlying commercial.

In some implementations, the ad production software provides users (employees or agents of the advertiser who are developing the interactive ad) with templates that they can use to define the ad. Using the templates, users can insert static graphics and text to be displayed at particular times and time intervals, audio and video content to be played during particular time intervals, questions and instructions requiring a response and formats for presenting the questions and obtaining the response, background audio or visual content, and other content. Additionally, or in alternative implementations, the ad production software can include a software development environment allowing users to develop interactive content for particular platforms, e.g., Blackberry, iPhone, Flash or Android mobile device platforms.

The ad production software generates one or more forms of interactive ad presentation according to the number of distinct target platforms (versions of client application software on supported client devices) supported by the interactive advertising system. In some implementations, all the presentations are included in a single interactive ad data package.

In some implementations, the ad production software displays a view port corresponding to a display of a client device and allows the user to "drag and drop" an advertiser's logo into an appropriate space in the view port designating the location in the client device display of the client application where the advertiser wishes its graphics to be located. The production software also ensures that graphic designs in the interactive ad presentations satisfy the requirements of the target client devices and client application software. In some implementations, the software can play the ad being developed in parallel with the underlying commercial, allowing the user through a graphical user interface to set timing marks in the ad for the playing of particular elements of the presentation. In some implementations, the ad can include data specifying timing instructions for the release of the interactive ad presentation, which may occur at or after the beginning of the underlying commercial, which enables the interactive advertising system to precisely synchronize the playing of the ad with the broadcasting of the commercial. In some implementations, the ad production software can play the ad presentation and the commercial at the same time, allowing the advertiser to test the ad presentation for correct synchronized timing and accuracy.

In some implementations, the ad production software includes predefined samples or prototypes for different kinds of interactive ads that the user can adapt to a particular commercial. The samples can be implemented as partially completed templates. In some implementations, the samples can include sample viewer interactions defining questions about the commercial, allowing the advertiser to identify the level of understanding and recall by the viewer of the key copy points of the underlying commercial. The samples can also include sample viewer interactions asking the viewer to press a key when a pre-specified audio or video cue is heard or observed, or viewer interactions with questions concerning the product or service advertised at the end of the commercial. The samples can also include random or demographically specified sample viewer interactions in which the viewer can request (a) a discount coupon, (b) a test drive, or (c) more information about the advertised product or service at the conclusion of the commercial. The samples can also include sample viewer interactions asking the viewer for specific feedback and opinions concerning the commercial itself, for example, a rating of the commercial for effectiveness, a rating of the spokesperson's performance, a rating of the theme music, the tag line or slogans, or a rating of the overall effectiveness of the commercial.

In templates or other form of user interface, the ad production software allows the user to specify, for inclusion in the interactive ad data package, information describing the ad, the advertiser, any incentives being offered by the advertiser in connection with the advertisement, the underlying commercial, target viewer demographics for the ad, i.e., a profile of the audience the advertiser wants to reach with the ad, reports requested by the advertiser, and other information relating to the ad. In particular, the user can specify a number of system award points or other incentives the advertiser desires to award to the viewer for correctly performing particular tasks set out in the interactive ad presentation. The software optionally allows advertisers to define as part of the target audience those members who have expressed a preference for one or more particular incentives or particular kinds of incentives.

In some implementations, the advertiser can specify who among the system members the advertiser wants to receive schedules, updates, alerts or any other information concerning any specific interactive ad, and the ad production software can include this information in the interactive ad data package.

In some implementations, the advertiser can specify the segment of the viewing audience about whom the advertiser wants to collect demographic information. In some implementations, the advertiser can specify the kinds of report, the demographic information and metrics about viewer participation, and other information to be reported by the interactive advertising system at the completion of the airing of the commercial.

Requested reports can include, e.g., the total number of viewers who interacted with the ad, the demographic profile of those who interacted with the ad, a demographic profile of those who responded to the ad favorably, e.g., through rating it favorably or requesting more information, and opinions of the participants about the commercial and the interactive ad experience.

In some implementations, the ad production software can calculate and display a cost or cost formula based on the services requested of the interactive advertising system, so the advertiser can determine an expected cost of the ad.

The advertiser will generally provide the interactive ad embedded in the commercial 112 to the broadcaster for inclusion in the broadcast program in the advertising slot the advertiser has purchased. For example, the ad production software or some other advertiser system can include all or part of the interactive ad data in the data of the commercial itself, where it will be available to the automated systems of the broadcaster and others. For example, interactive ad data can be embedded in an unused line of the vertical blanking interval (VBI) of an underlying commercial. Alternatively or in addition, the data can be digitally integrated into the audio or video portion of the commercial that is inaudible or invisible to the viewer. Alternatively, the interactive ad can be transmitted only to the interactive advertising system, e.g., electronically through any kind of data transport over the Internet.

For interactive ad data packages provided to broadcasters, the ad production software can include in the data a graphic or audio item to be broadcast as part of or shortly before the broadcast of the underlying commercial to alert viewers that the commercial is an interactively-enhanced commercial. The software can optionally allow advertisers to specify their own unique and copyrighted audio cues (for broadcast as part of the program before the commercial or separately to client devices) to be used to alert prospective viewers to the upcoming airing of their commercials.

In preferred implementations, the interactive ad data package is not sent to the broadcaster at all but instead sent to the interactive advertising system. In such implementations, the operations of the broadcaster are completely unaffected by the parallel simulcast of the interactive ad with its underlying commercial.

Production System

The core functionality of managing and transmitting interactive ads is performed by a part of the interactive advertising system that will be referred to as the production system 120.

The term "operator," or, when necessary to avoid ambiguity, "system operator," will be used to refer to a person or people 122 operating or managing the interactive advertising system, and in particular, the production system.

The production system includes one or more production servers 124 running software that synchronizes the broadcasting or releasing of interactive ads with the broadcasting of underlying commercials. The production servers are in continual communication with monitoring servers 126 that monitor television (and, in some implementations, radio) broadcasts of programs and particularly of commercials, decoding the broadcasts to find signals indicating the impending or actual broadcast of an interactively-enhanced program or interactively-enhanced commercial. Such signals can be embedded in the VBI or in digital or audio data in the commercial to be broadcast.

The production system can optionally monitor local television markets and remotely trigger the synchronized release of interactive ads by local production servers as commercials are broadcast in various time slots in local markets.

In scheduling and linking interactive ads with broadcast commercials, the production system can use interactive ad metadata that encodes a unique identifier of the specific commercial to which the ad is linked. The metadata also optionally includes data that defines a broadcast market for the ad.

The ad metadata can be received by the production system with the ad content in a interactive ad data package received from the advertiser, or it can be received from the advertiser separately through the advertiser support system.

The production system can use the scheduling information in the interactive ad metadata to trigger the release of audible tones or other audio or visual alerts on the members' client devices. The production system can limit alerts for an interactive ad to members in a respective target audience. The production system can send alerts at a predetermined time (e.g., 10 seconds) prior to the actual broadcast of a commercial, so that those interested in interactively-enhanced commercials and watching are alerted or those not watching the underlying program can be informed immediately before the commercial is broadcast.

The production system maintains a master schedule 138 that includes a schedule of all scheduled interactively-enhanced commercials, including the underlying programs with which the interactive ads will be broadcast and the estimated or specific time slots in which the interactively-enhanced commercials will be run. The schedule can include some or all of the following information for television programs: a list of upcoming programs containing interactively-enhanced commercials, including the television channel and time of local broadcast for the member's market; the position of an interactively-enhanced commercial within the specific program, if known; the specific sponsor of the commercial; the product category of the commercial; the genre of the interactive ad; and the number of points or other incentives to be awarded for participation in each specific commercial.

The schedule is made available to advertisers and members in their respective web sites or other interfaces to the interactive advertising system. The production system can provide a complete schedule of all of an individual advertiser's interactive-enhanced commercials scheduled for an upcoming period, e.g., 24 hours.

The production system broadcasts interactive ads to client devices, both for interaction in real time (real-time participation) during the broadcast of the underlying commercials, and on demand on a member web site or on a client device running client application software. The production system is the collection point for the data representing each member's interaction with an ad. The data is provided to the advertiser support system.

Depending on the client device and the interactive ad, the production system may interact with a client device (or with the client application software running on the client device), providing instructions and receiving user actions, while the underlying commercial is being broadcast. Generally, however, the client application software will upload the member's interactions with the ad after the commercial has ended. The production system can request particular client devices to upload their ad interaction data to the production system, or the data can be uploaded at a time determined by the client application software or by the member. In some scenarios, e.g., where the advertiser wants to verify current participation, the interactive ad and the production system will require real-time interaction between the client device and the production system as the underlying commercial is being broadcast.

From the ad interaction data and the metadata for the ad, the production system can detect that the member has performed one or more request actions correctly during, or at the conclusion of, the commercial. For example, the production system can determine that the member has answered questions in the interactive ad about the underlying commercial correctly and award points or prizes as specified in the interactive ad metadata. According to the incentives specified for the ad, the production system can award incentives to the members according to their performance, providing the necessary data to the incentives system. For example, the production system can make a sweepstakes entry for a successful member, or award points or e-coupons, by sending instructions to the incentives server.

The production system can also extract from the ad interaction data a request for a free trial or test drive of an advertised product or service at the conclusion of a commercial. Such a request can be recognized as a qualifying interaction or other recorded indication of interest in a particular product. The production system can record the interaction in a reporting database, which can be used by the advertiser support system to generate reports telling the advertiser that the commercial was viewed.

Similarly, the production system can verify the correctness of an answer to a question or questions about the commercial at its conclusion to verify that the entire commercial was viewed and understood, and record this information in the reporting database.

The production system can record each interaction with a particular ad by a member, based on an assigned unique ad identifier, and limit awards for interaction with a specific ad to one per member.

Broadcaster Support

Although it is possible for the interactive advertising system to provide interactive ads without the participation of broadcasters, broadcaster support is desirable. In some implementations, therefore, links to and support of broadcasters are provided, e.g., through a broadcaster web site.

In some implementations, broadcasters' automated broadcasting systems are configured to detect interactive ads in programs received from program producers and in response provide an announcement, e.g., at the beginning of a program broadcast, that the program is an interactively-enhanced program, i.e., a program containing interactively-enhanced commercials. A broadcaster can also promote upcoming interactively-enhanced commercials by broadcasting an audio or visual alert, e.g., a pattern of tones, a spoken announcement, or a screen bug, shortly before the commercial.

In the case of a live event, such as a sports event, for example, while the commercials to be broadcast are generally scheduled in a specific order, the exact time a commercial will be broadcast is determined with the cooperation of the broadcaster, e.g., by the television program director physically at the event in charge of the telecast, who in turn must wait for a break in the live action. The broadcaster can assist the system operator by providing a data signal or direct voice communication so that the operator has an advance warning, e.g., 5-10 seconds in advance, of the upcoming commercial break, that the operator can use to cause alerts to be sent to members. The broadcaster can also provide a signal indicating the exact time of broadcast of an interactively-enhanced commercial, allowing the system to synchronize release of the interactive ad with the beginning of the commercial. An interactive ad can be "released" either by transmitting it to the client devices for playing by the client devices as it is received, or by transmitting it before it should be played and transmitting a start play instruction to the client devices, either at the time play should start, or with a time at which the client devices are instructed to start the interactive ad.

In the absence of a communication from the broadcaster, the operator's producer can manually trigger the release of the interactive ad as the producer observes the start of the pre-scheduled commercial on a television monitor. For such cases, the release of the interactive ad may be predetermined to occur a fixed time, e.g., two seconds, after the start of the commercial, in order to accommodate the lack of advance warning. In this situation, the interactive ad would be synchronized on this predetermined delayed start point. Also, for such cases, as well as in general, the production system can automatically trigger the release of the interactive ad to occur at a fixed time after the detection of a signal embedded in the commercial itself, for example, a signal embedded in the VBI or the audio or video portion of the commercial.

Locally Inserted Television Commercials

Local television and cable channels can air both national and local (spot) commercials. Local spots are broadcast in time slots specifically reserved for local or regional advertisers.

Local advertisers can use the ad production software to create local interactive ads and can transmit them to the interactive advertising system as has been described for production with a local broadcast of a television program.

The advertiser identifies the ad as a local ad and the ad production software includes a unique identifier in the interactive ad data package to insure that the ad is only sent to the client devices of viewers who (a) are registered within the area where the commercial is scheduled to be run; (b) have a cell phone that is currently being controlled by a cell tower that serves the area where the commercial is scheduled to be run; or (c) are web viewers who are logged in and registered in the area where the commercial is scheduled to be run.

The production system can arrange for the interactive ad to be transmitted to the local members at the proper time through use of locally-based production servers that are in data communication with central production servers. The local server detects the upcoming local broadcast of the local commercial, as has been described, and signals a central production server when to release the specific interactive ad for the local commercial. Alternatively, the operator can arrange to release the interactive ad at the correct time (a) by engaging the services of a locally-based employee or contractor to provide a time of broadcast, (b) by obtaining commercial broadcast timing alerts from the local broadcaster, or (c) by local or remote monitoring of the broadcast signals of the local stations by a local or central production server.

An interactive ad and its warnings can also be synchronized with a commercial (a) by synchronizing the beginning of the broadcast of the program, through visual observation by a person, (b) by utilizing a local computer connected to a television tuner to monitor and synchronize the local telecast to signal a production server as to the precise time the broadcast of the underlying television commercial begins, or (c) by monitoring the local station's broadcast server directly by a production server, so that the show is precisely synchronized for any interactive advertisements and the precise time slots of the local commercials are monitored and the files automatically released to the client devices located in the local area.

In some implementations, local stations' programming servers are programmed to recognize an interactive ad in the programming data to be broadcast by the local station, generate an advance warning message for the interactive advertising system, and send the warning message to the system, allowing the system to cause alerts to be transmitted to local members.

In the case of previously recorded broadcasts of network programs that air in different time zones, or syndicated television programs where there are sometimes different stations or cable systems in the same markets broadcasting the syndicated program, synchronization of the correct interactive ad with the underlying commercial presents a challenge.

In addition to the methods described U.S. patent application Ser. No. 11/786,992, the disclosure of which is incorporated here by reference, the interactive advertising system can use a method of embedding data in the broadcast to identify the particular broadcast being received and viewed by the member. For example, the closed captioning segment can be programmed to contain data that triggers the display on the television screen itself at the beginning of the program or the interactively-enhanced commercial of a specific identifying code, for example, "interactive program number 487." This can be used by the production system to identify specifically which interactively-enhanced commercial, in which specific telecast and in which market the member is receiving the broadcast.

The member would enter this program's identifying code as requested by the client application software on the client device. This code is then used by a production server to trigger the timing of the release of the corresponding interactive ad to all client devices that have reported the same identifying code, in order to accurately synchronize the interactive ads in the upcoming commercials to the specific broadcast indicated by the code.

In all other respects, the transmission of alerts and selection of a target audience is the same for local or syndicated broadcasts as for other broadcasts.

Incentives System

The interactive advertising system includes an incentives system 150.

The incentives system administers and maintains members' award accounts, including the terms and conditions for granting and redeeming awards generated from an interaction with an interactively-enhanced commercial.

This system includes an incentives database 152 that is used by the incentives system and other parts of the interactive advertising system to track member incentives.

The incentives system can receive instructions from the production system as to incentives that members have been awarded for particular successful interactions with particular interactive ads. In response, the system can update the respective members' accounts to reflect the awards.

The incentives system or the production system can notify a member through the members web site or through the members' client device of the incentives that the member's account has been credited with, as soon after the member's participation as the awards have been recorded.

The incentives system optionally provides a marketplace that allows members to exchange incentives they have been awarded for other incentives. In some implementations, advertisers and other providers of incentives can assign a value to the incentives in award points, allowing members to exchange those incentives that have such a value and not exchange incentives that do not. The provider of an incentive, an electronic coupon (e-coupon), for example, may have offered the incentive only to a particular demographic and, therefore, may not want the incentive to be transferred to a member who is not part of the target demographic.

The incentives system maintains a secure data repository (database) of unredeemed e-tickets, e-coupons, and other awards. Incentives offered by advertisers and others can be maintained in the repository before they are awarded. They can also be maintained in the repository after they are awarded but while they are unredeemed. From the repository, awards may be redeemed by members and, optionally, exchanged with other members before redemption. The incentives system thus keeps track of all redeemed and unredeemed e-coupons, awards, e-tickets, and other incentives.

In some implementations, the incentives system can electronically transfer incentives from a member's account, e.g., points, e-coupons or e-tickets, to a member's cell phone, PC, or other device, using, for example, a bar code technology to generate e-coupons, e-tickets, and awards in a form that can be redeemed at a retail location, for example. In some implementations, the incentives system supports secure online connections to participating retail establishments to enable, authorize, and track the redemption of a particular incentive, which will then automatically be removed from the respective member's account.

In some implementations, the incentives system can maintain a database of retail establishments participating in the redemption of system incentives. When a member authorizes the client application software to provide the member's current location to the system, e.g., from a GPS (Global Positioning System) or LBS (Location Based System) technology on the member's mobile device, the system can determine that the member is close to a retail location participating in award redemptions for awards the member has in the member's account and send a notification to the member's mobile device telling the member that such a retail location is near.

In implementations where the system can track the incentive redemptions, the system can, at the advertiser's request, generate and deliver to the advertiser an award redemption report, so that the advertiser has a record of who (individually or in the aggregate, according to the governing privacy policy) actually redeemed the advertiser's awards, with a demographics report.

Advertiser Support System and Web Site

The interactive advertising system includes interfaces 140 for online access by actual and potential advertisers using the system. The functionality of these interfaces will be described in reference to an illustrative advertiser web site, which will now be described. However, other forms of interface for electronic data exchange may also be used.

Advertisers can use the advertiser web site to obtain ad production software to use to author interactive ads. An advertiser can use the site to upload completed interactive ads to the interactive advertising system. Through the site, an advertiser can update or override scheduling, incentives, target demographics, desired reporting, or other data in an uploaded interactive ad, and the advertiser can obtain reports relating to pending and completing interactive advertising campaigns.

As requested by the advertiser, a reporting system of the advertiser support system can generate and deliver reports for each interactively-enhanced commercial that can include, for example, the number of participants, the demographics of participants, specifically how and/or how accurately the participants interacted with the ad, e.g., answered questions, requested information, rated the ad, and so on.

Through the interfaces provided by the advertiser web site, an advertiser can specify the reports the advertiser wants to receive and how they should be delivered, e.g., by electronic mail, on the advertiser's private account web page, or otherwise. The advertiser can also specify who is to receive what reports. For example, an advertiser may choose to deliver certain reports to a broadcasting network or station, or to a producer of the program in which the interactively-enhanced commercial was broadcast.

The advertiser can also specify a target audience for particular interactive ads or for groups of or all of the advertiser's interactive ads. The target defines which members the advertiser wants to receive schedules, updates, alerts or any other information concerning any specific interactive ad or ads that have been submitted for broadcast. The advertiser's target audience may be defined to be every member or a demographic subset of members selected by the advertiser. The interactive advertising system can optionally allow an advertiser to expand a target audience to include members who have specified a preference for commercials by this particular advertiser, or for a specific category of ads, or to include members who in the past have interacted with a particular interactive ad, an interactive ad of a particular advertiser, an interactive ad of a particular kind, or an interactive ad in a particular television program. In some implementations, the advertiser can define a target audience to be a group specifically selected or recruited to be part of a test market.

The ad production software or the web site allow an advertiser to specify incentives the advertiser will award for members' participation in a particular interactive ad. Incentives can include a number of award points that may be won for participating in the ad or for responding correctly to the ad, a free entry into a sweepstakes, a high value e-coupon, an e-ticket or other promotion.

Through the web site, the advertiser can purchase the award points and other incentives not provided directly by the advertiser that the advertiser offers successful participants in interactive ads.

Through the web site, advertisers can optionally post interactively-enhanced commercials for viewing on an advertising web site, on the members web site, or on another source accessible from a client device, with incentives for those who watch the commercials and participate in the ads. With such commercials, both the ad information and the commercial are displayed on the client device.

In addition to specifying incentives for members who participate in individual ads, advertisers can offer incentives to members who watch and respond to a minimum number of unique interactively-enhanced commercials within a time period, e.g., each week, either as they are broadcast or later on an advertising web site, in order to encourage members to visit the advertising web site and watch commercials that they might have missed as they were broadcast.

Finally, through the advertiser support system, e.g., through the web site or through the production system, the interactive advertising system can present to an advertiser the anticipated fees for the services of the system to the advertiser with respect to a particular interactive ad and underlying commercial. The fees can be based on a variety of measured quantities. The fees can be based, for example, on the size of the interactive ad, on the number of client devices to which the ad is broadcast, on the reports requested, on the number of members the system can demonstrate have viewed the underlying commercial from beginning to end, on the number of correct member responses to key copy points, or on any other commercially relevant quantities. The advertiser may also define a demographic profile that a viewer that successfully interacts with its commercial must fall within for purposes of the calculation of the advertiser's fees. The system can make rate card data and member demographic data available to the advertiser support system to enable the advertiser support system to calculate the range of anticipated fees.

Third-Party Incentives

Not all incentives have to be offered by the advertiser sponsoring the interactive ad.

Both the operator and other third parties can offer incentives to members (or even non-members) participating in interactive ads.

For example, the operator can offer points and other incentives to members for their interaction with interactively-enhanced commercials, in addition to those awarded by advertisers.

Similarly, a company, including a broadcaster, can offer coupons or discounts for its products or other incentives to members who are in the company's target demographic and locations. A company can establish an account on the advertiser web site, just like any other advertiser, and define demographics and locations of the members to whom it wants to offer its incentives, in connection with the members' participation in other advertisers' interactive ads. The system allows a company to specify, in addition, products and advertisers it does and does not want its offers to be paired with.

Member Support System and Web Site

The interactive advertising system includes interfaces 160 for online access by actual and potential members 162 of the system. Such interfaces can include interfaces provided by client application software running on client devices, which in some versions allow the user to interact with the system for registration and other purposes, and a member web site, where members can register, set and update preferences, and perform other actions. The functionality of these interfaces will be described in reference to an illustrative members web site, which will now be described.

People can register as members before or after they have downloaded the client application software to their client devices. However, people will be required to register as members in order to participate in the incentives program, to qualify to win prizes, to enter sweepstakes, to receive award points, and to activate the client application software.

The member web site provides access to functionality of the member support system through web pages for the various functions. The member support system is part of the interactive advertising system and, in addition to providing an interface for members, also maintains a member database 164, which stores data about each member, including identifying information identifying the member and at least one client device for the member, demographic information about the member, the member's preferences, and the status of incentives the member has been awarded.

After the member has registered, the system creates a personal and private account for the member and activates client application software on the client device or devices of the member. In some implementations, the member support system provides chat rooms and communities of interest in which members can participate.

A member can provide and update a variety of member information through the member web site, which the system will maintain in the member database.

The member information for a member can include the member's preference for particular kinds of incentives, e.g., coupons, points, etc., the member's interest in the various categories of advertisers and sponsors, the member's interest in particular television programs, the member's interest in particular categories of interactively-enhanced commercials, and the member's participation in particular interactively-enhanced commercials.

The member information can also optionally include the member's preferences for personalized alerts for interactively-enhanced commercials, including how and when the member wants to be alerted, including whether the member wants to get an alert for the program containing the interactively-enhanced commercial or for the interactively-enhanced commercial itself or both.

The member web site can also optionally allow a member to select particular forms of alert, e.g., particular tones, for particular alerts. Tones can be set according to the member's selected importance of the commercial, for example, one specific ring for a commercial of minor interest and three rings for a sweepstakes for a prize of great interest to the member.

The member web site can also give members access to their account information, including award point balances, coupons awarded, sweepstakes entered, and other incentives held by the members. A member can determine, for example, if the member requested an entry into a sweepstakes, whether an entry has successfully been made, or if the member performed some task for points, whether the member was successful.

The member support system provides continually updated schedules of interactively-enhanced programs and commercials, both on the web site and on client devices. The web site and client application software can maintain the schedule information in an indexed form so that the member can search the schedule using various search criteria, including television program, advertiser, genre of ad (e.g., sweepstakes, question-and-answer, synchronized button press, coupon offer, sweepstakes, coupons, free trial, test drive, voting, etc.), category of commercial (i.e., product or product category being advertised), or other descriptive information. The schedule can also be presented filtered so that only certain programs and commercials are shown, filtered according to the member's previously stored preferences or selections made while viewing the schedule. The system also maintains schedules on a WAP (Wireless Application Protocol) site for access from mobile client devices.

The member web site can also deliver streaming, on demand, interactively-enhanced commercials which the member may not have viewed when they were broadcast, which the member can interact with in the ways described in this specification.

Client Device and Client Application Software

Generally, a client device 170 is a device that can (i) receive a presentation file—e.g., a text file or media file—that includes requests for user input, (ii) present the presentation file content—e.g., on a display device, (iii) receive responsive input from a user of the device, and (iv) transmit the user input to the production system.

In some implementations, the client device is a cell phone, smart phone, personal digital assistant with a wireless capability, a personal computer ("PC"), a DVR coupled in two-way communication with a DVR service (e.g., the TiVo® service), a set-top box coupled in two-way communication with a cable broadcast system, or similar device. Running on such a client device is client application software 172 (in a version configured for the particular device) that is configured to interact with the interactive advertising system and to play interactive ads provided by the production system. For a client device to "play" an interactive ad means that the device presents the audio and visual presentation content of the ad to the user, and executes any instructions in the ad as to providing instructions to and receiving responses from the user, and as to communicating responses and other information to the production system.

The client application software (or "client", for short) can receive interactive ad files from the production system and play them for the user, receiving and storing user responses to questions and instructions as specified by the files. Responses can include providing answers to questions, hitting a specific key on the client device when requested, and so on. The interactive ad received by the client causes the client to display the content provided by the advertiser, which can include logos, designs, audio and video content, in addition to questions, offers, and other interactive material. In some implementations, the client application software can read identifiers of ad features, e.g., incentives, genre, or advertiser, from the interactive ad received by the client, and display the feature information on the client device.

Some clients are only capable of playing an interactive ad as it is received. When sending an interactive ad to such clients, the production system will broadcast the interactive ad simultaneously with the local broadcast of the underlying commercial. Some clients are capable of storing an interactive ad sent to the client in advance and playing it at a pre-set time or upon the receipt of the synchronizing signal from the production system. In the alternative, if known, an instruction can be sent to start playing the interactive ad at a specific pre-set time.

The client application software can be installed on a client device by a manufacturer, distributor or retailer of the client device, by the member, e.g., as part of the registration process or from an interactive advertising system web site, or by a third-party play-along or interactive television company as a module of the company's own real-time play-along interactive television application.

After the client application software has been installed on a client device, prospective interactive advertising system members will be required to register with the system in order to participate in the awards program, to qualify to win prizes, enter sweepstakes, receive award points, and activate the client application software. In addition to demographic information, the registering member can supply information about their television viewing habits and their preferences in prizes and awards. The system will activate the client application software on the client device when registration is complete.

The system associates at least one client device with each member.

The client application software can upload the viewer's responses to an interactive ad to the production system instantly, or store information about the interactions in a client device memory and then in response to a viewer or server request to transmit the information back to the production system, or transmit it automatically at a time determined by the client. The information transmitted to the production system will include a member ID, if the client device is registered to be used by more than one person; and it will include information identifying the underlying commercial and the interactive ad.

The client can also receive alert messages from the production system and cause the client device to play tones or emit vibrations as specified in the messages to notify the user of an upcoming interactively-enhanced commercial or other event. The client application software can optionally include an interface through which members can schedule advance alerts on the client device of upcoming interactively-enhanced commercials. In some implementations, the system includes a members web site with an interface for members to use to schedule alert messages and set any other user preferences. The client application software or members web site can optionally allow a member to select particular forms of alert, e.g., particular tones, for particular notifications. Tones can be set according to the member's selected importance of a commercial, a sponsor, or an offered incentive.

In some implementations, the production system also supports dumb client devices by providing all the required interactive functionality on the server side and using the dumb client devices as simple text input and out devices, e.g., through the exchange of SMS messages. The client application software can optionally also be implemented as a web application that runs on a server and is controlled through a web browser interface on a PC or smart phone, for example. For some such implementations, the interactive ad presentation includes content that is streamed to the client device in real time.

In some implementations, the client application software can be obtained from the production system and present to the user schedules of upcoming events on the interactive advertising system, in particular interactively-enhanced programs and interactively-enhanced commercials, including information about advertisers and incentives associated with them. In some implementations, the client application software has a user interface that a user can use to filter or select elements from the schedule, to show only programs, sponsors and incentives, or some combination of them, that the user is interested in. A member can also filter or select elements to be presented from the schedule by setting preferences in the members web site. The client can optionally update the schedule information periodically and give the user ring tone or vibration alerts for upcoming events the user has indicated an interest in, e.g., by setting preferences to be notified of particular programs, incentives, sponsorships, or events.

The client application software can be implemented in a client-side scripting language, as one or more widgets, as or in any other form of programming that can receive presentation data files and display them for user interaction in real time. The client can communicate with the production system through any wired or wireless protocol. Different versions of the client application software are implemented for different client devices. In some implementations, the client application software incorporates a Flash compatible player to play Flash compatible video or animation content in an interactive ad presentation. (Flash is a trademark of Adobe Systems Incorporated.)

The client application software and system schedules can be updated by the interactive advertising system as described in international patent application no. PCT/2006/024302 for "Method of and system for managing client resources and assets for activities on computing devices."

In implementations for a DVR system or other client device where the commercial is received and accessible to the client application software, the client application software can recognize and extract interactive ad data embedded in the video data of the commercial, e.g., in the VBI, either in real time or on demand at the viewer's convenience using a DVR, and use the DVR's on screen display to present the TV commercial and the interactive ad simultaneously.

In implementations for a DVR or set-top box system, the client application software can use the system's remote control capabilities for viewer input and display an interactively-enhanced commercial and its associated interactive ad simultaneously on the television monitor. This can be done either by using a divided screen, graphic overlay, or PIP (picture in picture), by displaying the interactive ad in a space created by reducing the size of the program display, or other similar method of displaying information with TV programming on a display device. In such systems, the client application software can use the system's capabilities to receive upcoming programming schedules in advance and display a time and source based schedule of future interactively-enhanced commercials and corresponding interactive ads.

In addition, when installed on a DVR, the client application software can optionally allow the viewer to specify that all or only certain interactively-enhanced commercials be recorded on the DVR, and allow them and their interactive ads to be recorded separately from the television program in which the commercial was broadcast.

In client devices that can record the program and later play it for the viewer, the client application software can read a recorded program with its interactively-enhanced commercials in advance and use that information to provide all forms of alerts of a forthcoming interactively-enhanced commercial or interactively-enhanced program according to the viewer's selected preferences.

When installed on a client device that is suitable for use by multiple users, the client application software can allow more than one person in a household to participate in an interactive ad if multiple people are members, in which case the client application software would require entry of each member's personal ID at the end of the process and provide the ID to the production system.

When a viewer watches a program streamed over the Web, the client application software will, at the user's choice, display the interactive ad information including alerts and the identification of the television program as an interactively-enhanced program, either by using a divided screen, graphic overlay, or PIP (picture in picture), by displaying the interactive ad in a space created by reducing the size of the video, or other similar method of displaying information with TV programming on a display device.

In some implementations, the system can include a web site or other source accessible from a client device on which advertisers can post commercials with incentives for those who watch the commercials. In some implementations, the system supports pushing commercials and promotions to client devices and inviting members to view interactively-enhanced commercials on the client device. Thus, some implementations of the client application software enable the viewer to get or receive and play interactive ads and underlying commercials on the client device's display device, and obtain incentive awards for doing so.

In some implementations, the system supports interactive ads for underlying radio commercials. A client can receive and play an interactive ad for a radio commercial just as it can for a television commercial. In some implementations, the client device can be an interactive radio receiver, e.g., a PC receiving a streaming radio broadcast, and the client application software can present the interactive ad on the PC's display and receive listener input from the PC's keyboard or a graphical user interface.

Other Applications

The tools and systems for preparing and distributing interactively-enhanced commercials for television viewers can be adapted for the preparation and distribution of interactively-enhanced radio commercials, including commercials in broadcast, satellite, or Internet streamed radio programs. In some implementations, the radio program receiver and the client device for presenting the listener interaction can be the same device, e.g., where the streamed radio broadcast and the interactive ad are received by the same PC.

The system can optionally be used to run surveys.

In some implementations, the advertiser web site provides advertisers a user interface to define a survey related to an upcoming television event, such as a program or commercial, and invite randomly selected members, optionally in a target demographic, to participate in the survey in exchange for incentives.

The production system schedules and synchronizes the distribution of the survey in the same way interactive ads are distributed, using alerts to members both to recruit and then to remind participants of the upcoming event which is the subject of the survey. The advertiser support system enables the advertiser to define and provide incentives for the survey just as an advertiser does for interactive ads. The production system obtains and reports responses to the survey just as responses to interactive ads are obtained and reported, including a demographic analysis of the responses.

Embodiments in Data Processing Apparatus

Embodiments of the subject matter and the functional operations described in this specification can be implemented in digital electronic circuitry, in tangibly-embodied computer software or firmware, in hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying FIGURE do not necessarily require the particular order shown, or sequential order, to achieve desirable results. In certain implementations, multitasking and parallel processing may be advantageous.

The invention claimed is:

1. A system comprising:
one or more computers programmed to perform operations comprising:
receiving in a data processing system an interactive ad, the interactive ad including an interactive ad presentation, the interactive ad relating to a specific underlying commercial, the underlying commercial being scheduled for broadcast at a future time to television receiving devices in a geographic viewing area over a first communication channel, the underlying commercial being distinct from the interactive ad;
extracting metadata from the interactive ad, wherein the metadata indicates an incentive associated with the interactive ad and includes an identifier for the specific underlying commercial to which the interactive ad is related;
identifying registered members of an interactive advertising system who are located in the geographic viewing area; and
sending an alert to client devices of respective registered members over one or more communication channels that are each distinct and separate from the first communication channel, the alert notifying registered members who are located in the geographic viewing area of the future broadcast of the underlying commercial before the scheduled future time of broadcast of the underlying commercial in the geographic viewing area, the alert including at least (i) some of the metadata extracted from the interactive ad and (ii) the future time of broadcast of the underlying commercial in the geographic viewing area; and
client devices of registered members who are located in the geographic viewing area and have television receiving devices for receiving broadcasts over the first communication channel that are distinct from the client devices, wherein:
each of the client devices has a respective display screen; and
each of the client devices includes client application software configured to (i) receive interactive ad presentations over the one or more communication channels that are each distinct and separate from the first communication channel, and (ii) display the interactive ad presentations on the display screen in synchronization with the respective underlying commercials while the respective underlying commercials are simultaneously broadcast to the television receiving devices over the first communication channel.

2. The system of claim 1, wherein the geographic viewing area is a national viewing area.

3. The system of claim 1, wherein the geographic viewing area is a regional or local viewing area.

4. The system of claim 1, wherein the alert is sent before the interactive ad is released.

5. The system of claim 1, the operations further comprising:
identifying a broadcast program in which the underlying commercial will be aired, wherein the alert is sent before a program is aired.

6. The system of claim 1, wherein the one or more computers are coupled to the Internet and programmed to perform time synchronized transmission of interactive ad presentations to registered members over the Internet.

7. The system of 1, wherein each of the one or more client devices is configured to (i) receive an interactive ad presentation file that includes requests for user input, (ii) present content of the interactive ad presentation file on the display screen of the client device, (iii) receive responsive input from a user of the client device, and (iv) transmit the user input to the one or more computers.

8. The system of claim 7, wherein the one or more client devices include devices having a remote control capability for viewer input.

9. The system of claim 1, wherein the client application software is further configured to present interactive ad questions and instructions requiring a response and formats for presenting the questions and obtaining the response.

10. The system of claim 1, wherein:
sending the alert comprises sending the alert before sending the interactive ad presentation to the client devices, the alert comprising data operable to cause the client devices to notify users of the client devices of an upcoming presentation of the interactive ad.

11. The system of claim 1, the operations further comprising:
obtaining demographic data associated with the interactive ad, the demographic data specifying demographic characteristics; and
identifying a target audience for the interactive ad from the demographic data;
wherein sending the alert to client devices comprises sending an alert to members of the target audience that identifies incentives specified for the members of the target audience.

12. The system of claim 1, wherein:
the first communication channel comprises a cable television broadcast, a local television broadcast, or a satellite television broadcast;
the alert is sent over the Internet or a cellular telephone network; and
the client application software is configured to receive the interactive ad presentations over the Internet or the cellular telephone network.

13. The system of claim 1, wherein each of the one or more client devices is a mobile phone;
wherein sending the alert comprises sending, to the mobile phones, the alert notifying registered members who are located in the geographic viewing area of the future broadcast of the underlying commercial; and
wherein each of the mobile phones includes the client application software configured to (i) receive interactive ad presentations over the one or more communication channels that are each distinct and separate from the first communication channel, and (ii) display the interactive ad presentations on the display screen in synchronization with the respective underlying commercials while the respective underlying commercials are simultaneously broadcast to the television receiving devices over the first communication channel.

14. The system of claim 1, wherein the client application software is configured to cause display of interactive ad presentations to be synchronized with a beginning of the broadcast of the respective underlying commercials, such that the display of the interactive ad presentations begins at predetermined time with respect to the beginning of the broadcast of the respective underlying commercials.

15. The system of claim 1, wherein the client application software is configured to:
receive a particular interactive ad presentation in advance of broadcast of the specific underlying commercial related to the particular interactive ad presentation; and
after receiving the particular interactive ad presentation, display the particular interactive ad presentation in response to an instruction received over a communication network.

16. The system of claim 1, wherein the client application software is configured to:
receive (i) a particular interactive ad presentation and (ii) schedule information indicating a time to start display of the particular interactive ad presentation, the time being synchronized with broadcast of a specific underlying commercial corresponding to the particular interactive ad presentation; and
initiate display of the particular interactive ad presentation at the time indicated by the schedule information.

17. A system comprising:
one or more computers programmed to perform operations comprising:
receiving from a first advertiser an interactive ad data package, the interactive ad data package including an interactive ad presentation for simulcast with a broadcast commercial transmitted over a television broadcast network, the interactive ad data package including incentive data specifying one or more first incentives for viewers who interact with the interactive ad presentation;
receiving from a second advertiser information specifying one or more second incentives and a desired demographic profile for each of the second incentives;
transmitting the interactive ad presentation to first viewers having individual viewer profiles not matching any of the desired demographic profiles for the second incentives and offering at least one of the first incentives from the first advertiser but none of the second incentives from the second advertiser for interacting with the interactive ad presentation; and
transmitting the interactive ad presentation to second viewers having individual viewer profiles matching at least one of the desired demographic profiles for the second incentives and offering at least one of the first incentives and at least one of the second incentives to the second viewers for interacting with the interactive ad presentation;
wherein transmitting the interactive ad presentation to first viewers and transmitting the interactive ad presentation to second viewers comprise:
transmitting the interactive ad presentation over the Internet to a respective client device for each of the first and second viewers for display in synchronization with a broadcast of the broadcast commercial over the television broadcast network, each client device being an electronic device coupled to a respective display monitor, each electronic device being operable to display the interactive ad presentation received by the electronic device over the Internet on the display monitor while the broadcast commercial transmitted over the television broadcast network is displayed on a separate television monitor.

18. The system of claim 17, wherein:
the interactive ad data package including incentive data specifying one or more desired demographic profiles for each of the first incentives; and
the first viewers are viewers having individual viewer profiles matching at least one of the desired demographic profiles for the first incentives.

19. The system of claim 17, wherein second advertiser is a broadcaster of the commercial.

20. The system of claim 17, the operations further comprising:
offering to a particular first viewer a particular first incentive that best matches the particular first viewer's individual viewer profile.

21. The system of claim 17, the operations further comprising:
offering to a particular second viewer a particular second incentive that best matches the particular second viewer's individual viewer profile.

22. The system of claim 17, wherein the television broadcast network comprises at least one of a local television broadcasting network, a cable television network, and a satellite television network.

\* \* \* \* \*

UNITED STATES PATENT AND TRADEMARK OFFICE
CERTIFICATE OF CORRECTION

PATENT NO. : 9,716,918 B1
APPLICATION NO. : 12/590608
DATED : July 25, 2017
INVENTOR(S) : David B. Lockton and Kathy Austin Lockton Page 1 of 1

It is certified that error appears in the above-identified patent and that said Letters Patent is hereby corrected as shown below:

In the Claims

Column 20, Line 54, in Claim 7, after "of" insert -- claim --.

Column 20, Line 64, in Claim 9, after "of" insert -- claim --.

Signed and Sealed this
Fourteenth Day of April, 2020

Andrei Iancu
*Director of the United States Patent and Trademark Office*